No. 651,279. Patented June 5, 1900.
L. E. TALMAGE.
CORN OR CANE HARVESTING MACHINE.
(Application filed Nov. 10, 1899.)
(No Model.) 5 Sheets—Sheet 1.
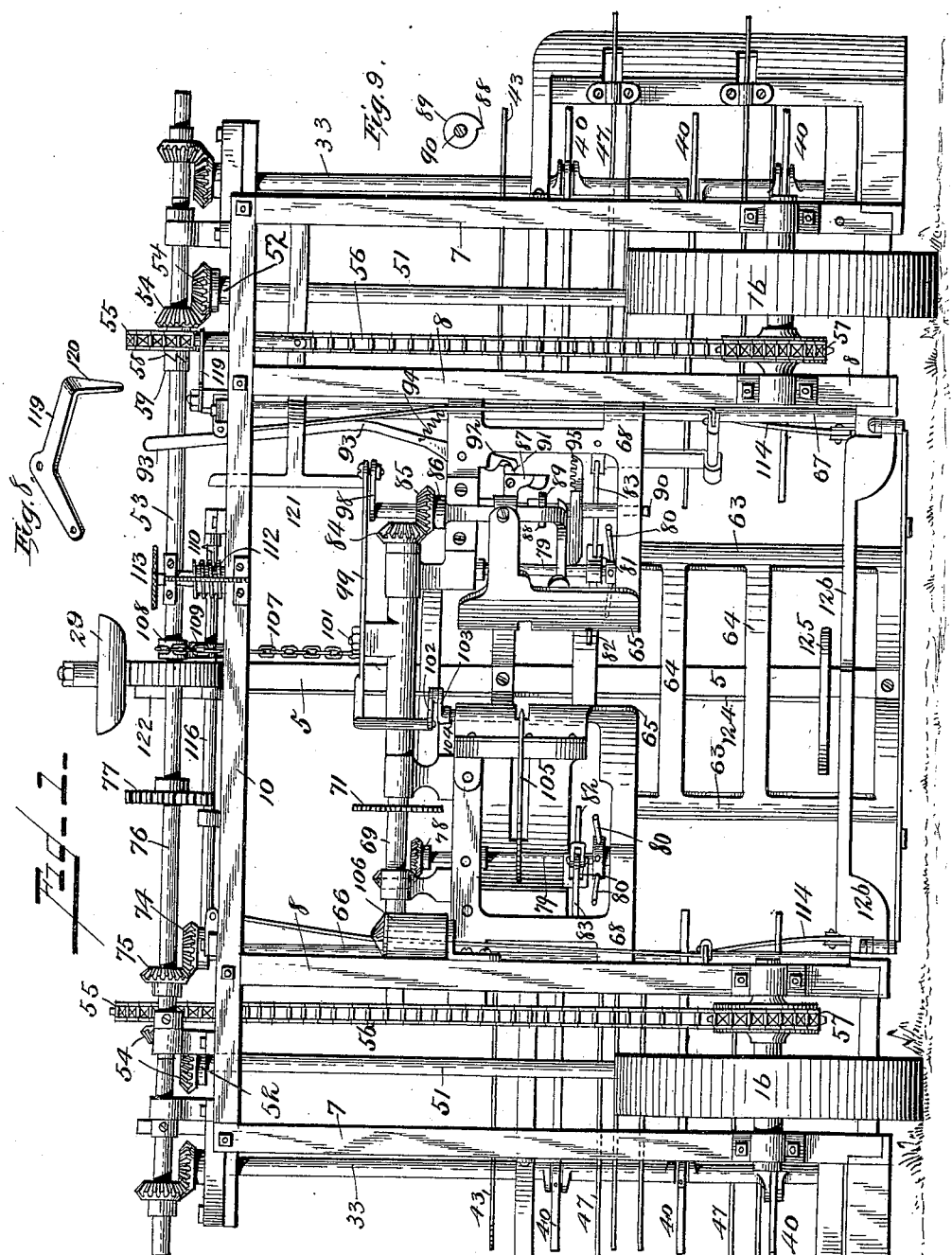
WITNESSES:
Franck L. Ourand.
Grace P. Brereton.
INVENTOR
Lewis E. Talmage,
BY
ATTORNEY

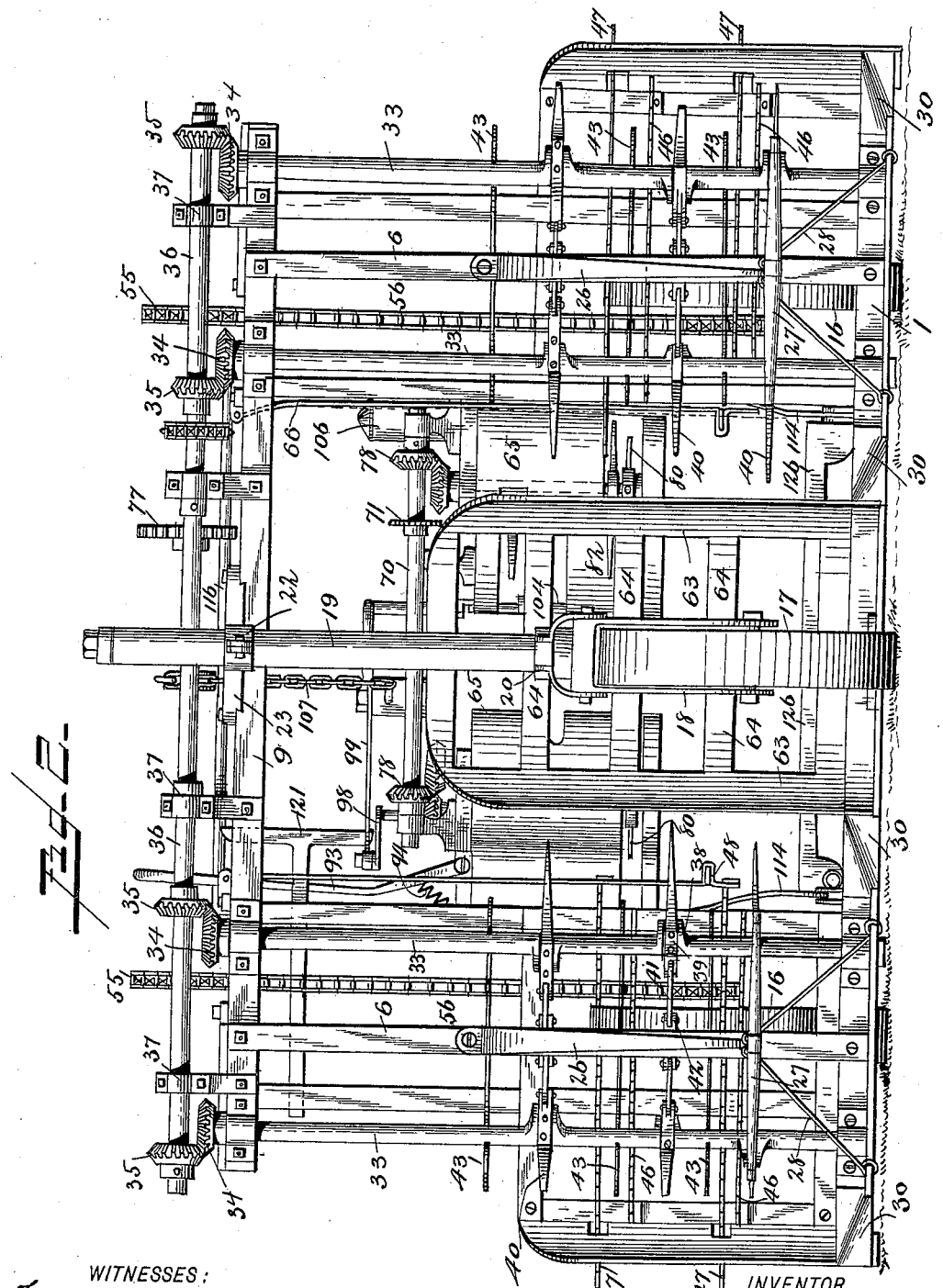

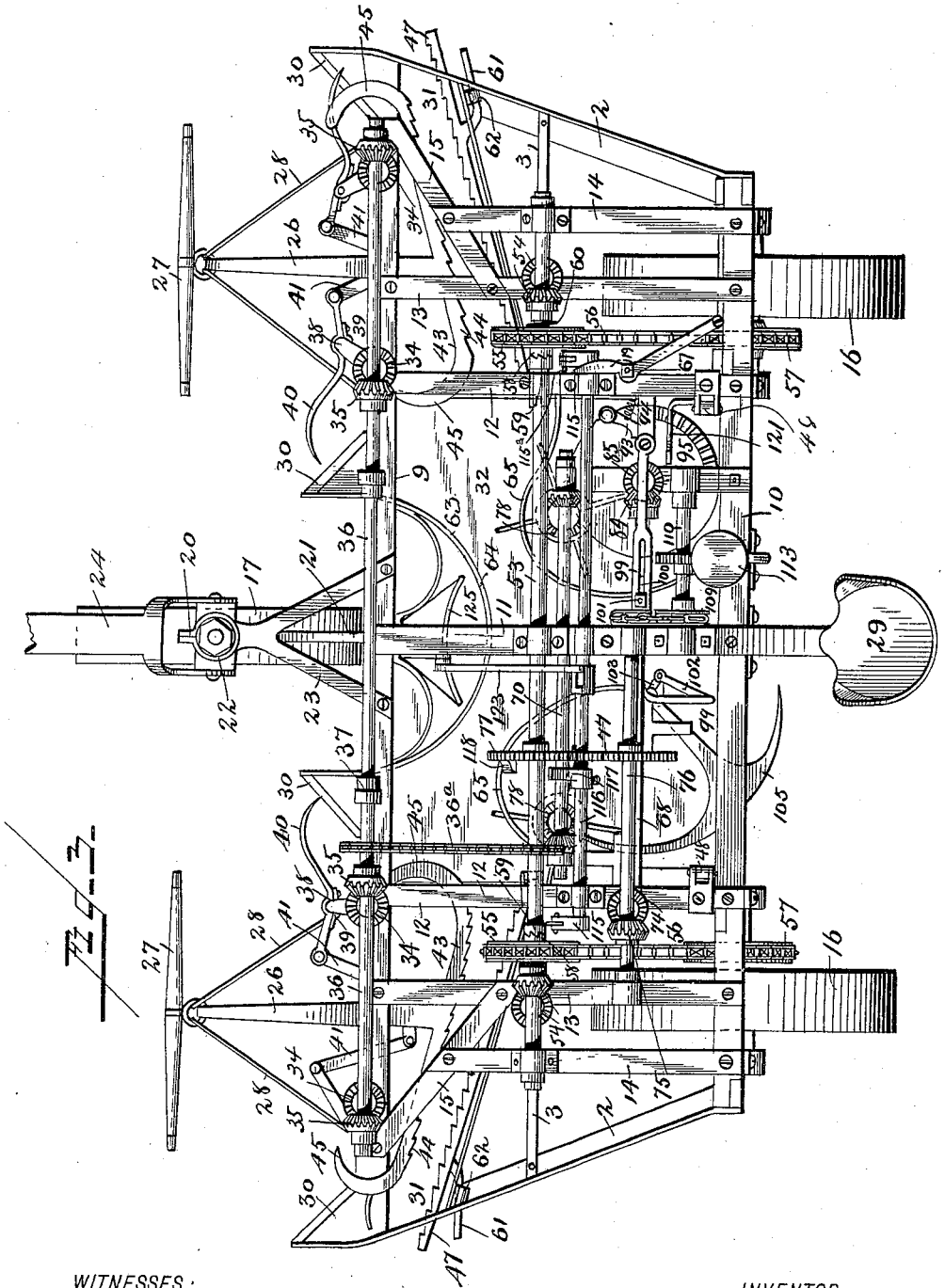

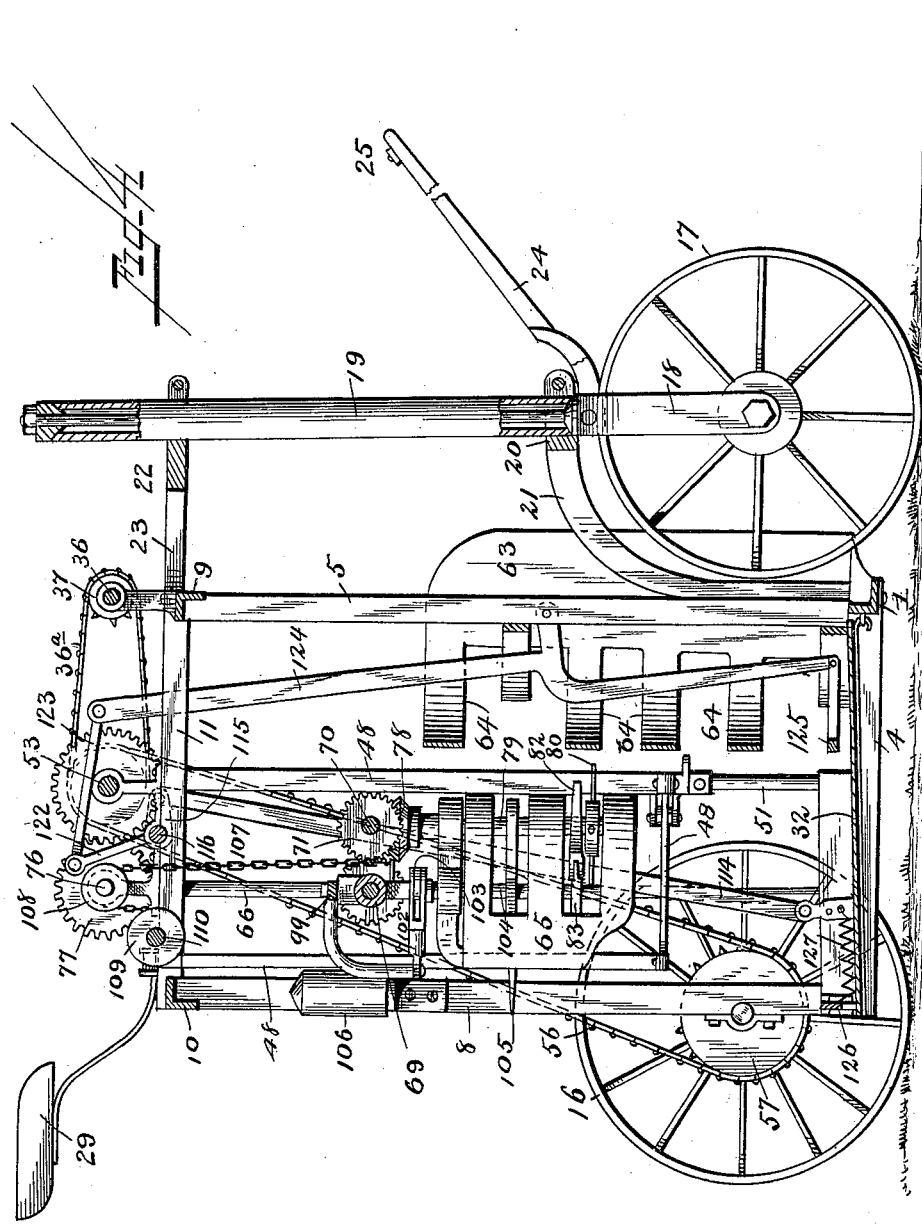

No. 651,279. Patented June 5, 1900.
L. E. TALMAGE.
CORN OR CANE HARVESTING MACHINE.
(Application filed Nov. 10, 1899.)
(No Model.) 5 Sheets—Sheet 5.
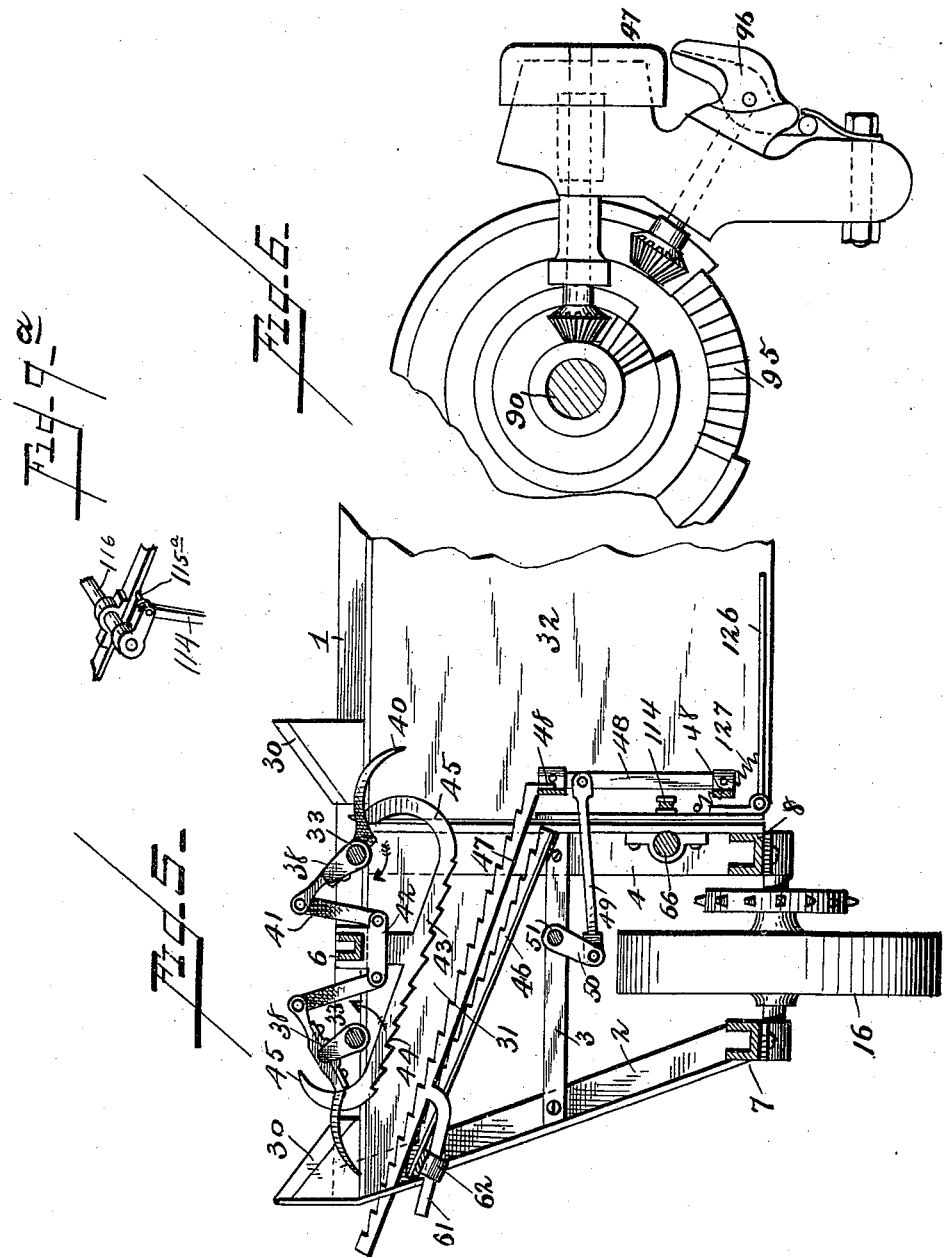
WITNESSES:
Franck L. Ourand.
Grace P. Brereton.
INVENTOR
Lewis E. Talmage,
BY
ATTORNEY
THE NORRIS PETERS CO., PHOTO-LITHO., WASHINGTON, D. C.

UNITED STATES PATENT OFFICE.

LEWIS E. TALMAGE, OF YORK, NEBRASKA.

CORN OR CANE HARVESTING MACHINE.

SPECIFICATION forming part of Letters Patent No. 651,279, dated June 5, 1900.

Application filed November 10, 1899. Serial No. 736,567. (No model.)

*To all whom it may concern:*

Be it known that I, LEWIS E. TALMAGE, a citizen of the United States, residing at York, in the county of York and State of Nebraska, have invented certain new and useful Improvements in Corn or Cane Harvesting Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for harvesting corn or cane.

The object is to cut four rows of standing corn or cane, gather the stalks into a shock, bind it, and deliver it upright. In this way the shocks will be left in rows, the shocks in each row standing near each other, but the rows being separated by the width of four rows of corn, thus leaving room to put in small grain conveniently, if desired. The mechanism by which I accomplish this result consists in stationary knives to cut the stalks near their lower ends, throw-arms which reach out behind the stalks and keep them from falling as they are cut and also move with the stalks as they pass into the machine, gathering-racks which move the stalks toward a common center, picker-fingers carrying the stalks to the binding mechanism, a binding mechanism for knotting a cord around the shock, and a platform and delivery apparatus for discharging the shock from the machine. The mechanism is organized into a machine mounted on wheels and adapted to be drawn by a team through the corn-field, cutting and binding as it goes.

In the accompanying drawings, Figure 1 is a rear view of my machine. Fig. 2 is a front view. Fig. 3 is a top plan view. Fig. 4 is an end elevation, partly in section. Fig. 5 shows the throw-arms and gathering-racks more clearly. Fig. 6 shows the knotter of the binding mechanism. Figs. 7, 8, 9, and 9ª are detail views.

The frame of the machine is composed of angle-bars. It comprises an L-shaped front sill 1 long enough to extend across four rows of corn. An end sill 2 runs back diagonally from each end of the sill 1 and is connected by a cross-girth 3 with an intermediate sill 4, extending back from the sill 1. On the front sill at its middle and between the ends of the sills 2 4 are set up posts 5 6, and similar posts 7 8 rise from the rear ends of the sills 2 4. A beam 9 connects the top of the posts 5 6, and a beam 10 the posts 7 8. Tie-girths 11 12 13 14 and diagonal braces 15 connect the beams 9 10. This frame is mounted on three wheels. Two of them, 16, are journaled in boxes attached to the rear posts 7 8, the wheel standing between the posts and the boxes being adjustable up and down to regulate this height of the frame above the ground. The other wheel 17 is located at the front of the machine, being journaled in a fork 18, which is rotatably mounted in a sleeve 19, held in a clamping-eye 20 at the front end of an arched bracket 21, rising from the front sill 1 at the base of the central post 5. An upper bearing 22 for the sleeve is provided in a bracket 23, extending from the beam 9. A tongue 24 extends forward from the fork 18, carrying a neck-yoke 25, at a height sufficient to clear the rows of corn, the draft-animals being attached to it from below. Attached to the front of the posts 6 are leaf-springs 26, to whose lower free ends are swiveled the whiffletrees 27. Rods 28 hold the whiffletrees in such a position as to keep the horses out of the knives. A seat 29 for the driver is secured to the rear beam 10.

The cutting apparatus consists of four stationary knives 30, bolted to the sill 1, with diagonal horizontal edges. They lie a few inches above the ground and being forced against the cornstalks by the progress of the machine the stalks are severed with a drawing cut. The tops of the knives are level with the upper edge of the sill 1 and with platforms extending rearwardly from said sill. The end platforms 31 are stationary; but the middle one 32 is hinged to the sill 1 for a purpose hereinafter explained.

Not far from the rear end of each knife is an upright shaft 33, journaled in boxes secured to the sill 1 and the beam 9. Each shaft has a bevel-gear 34 meshing with a similar gear 35 on a horizontal shaft 36, running parallel with the beam 9 and journaled in bearings 37 secured thereto. The upright shafts 33 will thus be rotated in unison, the shaft 36 being connected by a chain belt 36ª with the main driving-shaft hereinafter described. In each shaft 33 are formed several cranks 38, each of which carries a block 39, having a throw-arm 40 extending from it above the knife 30. The rear end of the arm beyond the crank is pivoted to a link 41, hinged to a block 42, fastened to the adjacent post 6.

Secured to the posts 6, adjacent to the throw-arms, are stationary racks 43, composed of a strip of metal having teeth 44 inclined toward the center of the machine. These racks run diagonally inward and rearward and are provided with curved ends 45, as shown, to facilitate the passage of the cornstalks by them. Straight racks 46, with similar teeth, are arranged a little in the rear of the racks 43 and parallel therewith. Adjacent to these stationary racks 46 are reciprocating racks 47 with teeth pointing in the same direction as those on the stationary racks and attached at their inner rearward ends to frames 48, hung at their upper ends to the cross-girths 12 and connected at their lower ends by pitman 49 with cranks 50, formed in upright shafts 51, which are stepped in bearings in the girths 3 and extend up through journal-boxes 52, secured to the cross-girths 13. A horizontal shaft 53, journaled in bearings on the cross-girths 11 12 13 14, drives the two upright shafts 51 by means of bevel-gears 54. Sprocket-wheels 55 on the horizontal shaft are connected by endless chains 56 with sprockets 57 on the driving-wheels 16. The sprockets 55 are loose on the horizontal shaft 53 and are provided with clutch-teeth 58, which engage with corresponding teeth on a collar 59, secured to the shaft. A spring 60 keeps the teeth in engagement while the machine is moving forward; but a backward movement of the driving-wheel 16 and sprockets 55 cause the clutch-teeth to disengage, the sprocket sliding on the shaft against the spring. This prevents the mechanism from being turned backward when the machine is backed.

Each reciprocating rack 47 has an arm 61, which runs off at an angle with the outer end of the rack and is guided by an eye 62 on the frame. The result of this construction is to give the racks 47 a movement toward and away from the stationary racks 43 in addition to their reciprocating movement.

The cornstalks cut by the knives are fed by the throw-arms and gathering-racks across the platforms 31 32 to a point behind the middle post 5. Shields 63 opposite the ends of the stationary racks 43 assist in guiding the stalks, the two center shields being united by curved ribs 64 inclosing spaces for the workmen to stand in. The stalks arriving from each side are forced into a contracted space between curved shields 65, which protect the binding mechanism. This mechanism is vertically adjustable to enable shocks of different heights to be properly bound. I prefer to arrange it as follows: An upright shaft 66 is stepped in one of the cross-girths 4 and extends up through a journal-box on the cross-girth 12 above. In a corresponding position on the other side of the platform 32 is an upright rod 67. Mounted to slide on the shaft 66 and the rod 67 are frames 68, which are united into one rigid structure by horizontal shafts 69 70, journaled in bearings on said frames. These shafts are geared together by spur-gears 71, and the shaft 69 is driven by a bevel-gear 72, meshing into a similar gear 73, splined on the upright shaft 66, which in turn is driven by bevel-gears 74 75, the latter on a horizontal counter-shaft 76, journaled in bearings on the cross-girths 11 13 and connected by spur-gears 77 with the main driving-shaft 53. The shaft 70 is geared by bevel-gears 78 to upright shafts 79, each having radial fingers 80 at the lower end to assist in bunching the stalks. There is also a crank 81 in each shaft 79, actuating a throw-arm 82, whose rear end is connected with the frame 68 by a link 83, the construction being similar to that of the throw-arm 40. The arms and fingers project through horizontal slots in the shields 65.

One of the frames 68 carries the knot-tying mechanism. On the shaft 69 is a bevel-gear 84, meshing with a bevel-gear 85 on a sleeve 86, journaled in an upright bearing in the frame 68. Mounted on the sleeve is a hinged dog or carrier 87, which is adapted to engage with a lug 88 on a collar 89, secured to an upright shaft 90, passing through the sleeve 86. A nose 91 on the carrier slides up an incline 92 on a lever 93 at every revolution of the sleeve, and thus swings the carrier out of line with the lug; but when the operator throws the lever over the carrier is permitted to engage with the lug and rotate the shaft. A spring 94 returns the lever to its normal position when released. The shaft 90 carries at its lower end a mutilated gear 95 for operating the knot-tying beak 96 and the cord-cutter 97. On the upper end of the shaft is a crank 98, on which is pivoted one end of the sway-bar 99, which has a slot 100, allowing it to turn and slide on the stationary fulcrum-pin 101. The other end of the bar is bent downwardly and connected by a link 102 with a rock-arm 103 on a vertical rock-shaft 104, carrying the curved needle 105. This needle is arranged on the opposite side of the space between the shields 65 from the knot-tying devices, but swings across said space in front of the shock to carry the cord around the shock and over to the knot-tying devices. Cord is carried in a box 106, attached to the frame of the machine.

The frames 68 are suspended by a chain 107, running over an idle pulley 108 to a drum 109 on a short shaft 110, which has a worm-gear 111, engaging with a worm 112, which can be turned by a hand-wheel 113.

When the shock is bound, the tilting platform 32 on which it stands is dropped to let it slide off at the rear. To accomplish this automatically, the platform is suspended by hangers 114, running up to rock-arms 115 on a rock-shaft 116, lying parallel with the main shaft 53. On the rock-shaft is an arm 117, which by a longitudinal movement of the shaft can be brought in line with a cam-lug 118 on the spur-gear 77 on the main shaft. As the spur-gear rotates the cam-lug strikes the arm 117 and rocks the shaft 116, thereby lowering the platform 32. The longitudinal movement of the rock-shaft is effected by a lever 119, having a finger 120, engaging with one of the rock-arms 115. A sliding bar 121 is suitably connected with the lever to enable the operator to move it when desired. The rock-arm at the right of Fig. 3 has its pin 115$^a$ extended toward the tie-girth 12, so that when the arm is raised and the shaft is slid to the left this pin will come over the tie-girth and rest thereon, thus preventing the shaft from rocking and the platform from dropping.

On the rock-shaft 116 is an arm 122, connected by a link 123 with a long upright lever 124, fulcrumed on the post 5 and carrying at the lower end a T-headed ejector 125, which when the platform 32 is lowered moves backwardly to force the shock off.

At the rear of the platform are two gates 126, hinged to the platform at each side and normally held closed across the rear edge thereof by means of springs 127. These gates assist in keeping the stalks in place until the shock is lowered; but when the platform drops the springs yield and the gates are opened by the weight of the shock, closing automatically when the shock has slid off.

The operation of my machine is apparent from the foregoing description; but it may be briefly stated to be as follows: The machine is drawn by a team through the corn or cane field with the knives each cutting a row of stalks as it progresses. The cut stalks are moved by the throw-arms and the gathering-racks into the central space in front of the binding mechanism where they are compactd into a shock, being prevented by the gates from sliding off the platform. When a proper quantity of stalks has been assembled, the operator sees that the binding mechanism is set at the right height and then throws the lever 93, which causes the binding mechanism to bind the shock. The rock-shaft 116 is then shifted to cause the platform to drop and the shock to be pushed off through the yielding gates.

Having thus described my invention, what I claim is—

1. In a corn-harvester, the combination with cutting-knives, of a plurality of vibratory throw-arms, and toothed gathering-racks arranged on each side of the space through which the cut stalks are fed.

2. In a corn-harvester, the combination with cutting-knives, of a plurality of vibratory throw-arms, stationary toothed gathering-racks, and reciprocatory gathering-racks.

3. In a corn-harvester, the combination with cutting-knives, of a plurality of vibratory throw-arms, stationary toothed gathering-racks, reciprocatory toothed gathering-racks, and means for causing them both to reciprocate and to approach and recede from the opposite stationary racks.

4. In a corn-harvester, the combination with an upright crank-shaft, of a swinging frame, a pitman connecting the crank with the frame, and toothed gathering-racks attached to said frame.

5. In a corn-harvester, the combination with a main frame comprising upper and lower cross-girths, of a main shaft journaled in bearings on said upper cross-girth, swinging frames hung from said upper cross-girths, upright crank-shafts journaled in bearings in the upper and lower cross-girths, gears connecting said crank-shafts with the main shaft, pitmen connecting the cranks with the lower ends of the swinging frames, and toothed racks attached to the lower portions of said frames.

6. In a corn-harvester, the combination with the main frame, of two upright rods therein one at each side of the binding-platform, one of said rods being rotatable, a frame vertically movable on said rods, two parallel horizontal shafts journaled in said frame, intermeshing gears on both shafts, an upright crank-shaft journaled in said frame at each side of the binding-platform, a throw-arm connected with each crank, and a binding mechanism carried by said frame and comprising a gear splined on the rotatable upright rod.

7. In a corn-harvester, the combination with a hinged platform, of hangers therefor, a hinged ejector, a rock-shaft having arms to which said hangers are attached, a rock-arm on said shaft connected with the ejector and means for operating said shaft.

8. In a corn-harvester, the combination with a rotating shaft, of a cam-lug carried thereby, an axially-movable rock-shaft having an arm adapted to be struck by said cam, rock-arms on the shaft, hangers attached to said arms, and a platform suspended by said hangers.

9. In a corn-harvester, the combination with a hinged platform, of a rock-shaft for dropping said platform, an ejector-lever swinging over said platform to push off the shock, and an arm on the rock-shaft connected with said lever, and adapted to swing it when the platform is dropped.

10. In a corn-harvester, a main frame composed of a front sill, rearwardly-extending end and intermediate sills, lower cross-girths, posts on the front sill and at the rear ends of the end and intermediate sills, top beams on the posts, upper cross-girths connecting said beams, wheels mounted between the pairs of rear posts, brackets on the front sill and beam, and a front wheel having a fork swiveled in bearings in said brackets.

In testimony whereof I affix my signature in presence of two witnesses.

LEWIS E. TALMAGE.

Witnesses:
J. L. INGREY,
CHAS. F. STROMAN.